(12) United States Patent
Cook et al.

(10) Patent No.: US 8,041,704 B2
(45) Date of Patent: Oct. 18, 2011

(54) SEARCHING FOR VIRTUAL WORLD OBJECTS

(75) Inventors: William Cook, Austin, TX (US); Cristina Lopes, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 400 days.

(21) Appl. No.: 12/249,793

(22) Filed: Oct. 10, 2008

(65) Prior Publication Data

US 2009/0144267 A1 Jun. 4, 2009

Related U.S. Application Data

(60) Provisional application No. 60/979,584, filed on Oct. 12, 2007.

(51) Int. Cl.
*G06F 7/00* (2006.01)
*G06F 17/30* (2006.01)

(52) U.S. Cl. .................. 707/709; 707/723; 707/748

(58) Field of Classification Search .................. 707/710, 707/723, 748, 765, 709
See application file for complete search history.

(56) References Cited

U.S. PATENT DOCUMENTS

| | | | | |
|---|---|---|---|---|
| 5,987,322 A * | 11/1999 | Gupta et al. | ............... | 455/432.1 |
| 6,532,401 B2 | 3/2003 | Tackett et al. | | |
| 6,564,210 B1 | 5/2003 | Korda | | |
| 2002/0099697 A1* | 7/2002 | Jensen-Grey | ..................... | 707/3 |
| 2002/0099700 A1* | 7/2002 | Li | ..................... | 707/5 |
| 2002/0169801 A1* | 11/2002 | Barnes et al. | ................. | 707/513 |
| 2003/0028896 A1* | 2/2003 | Swart et al. | ................... | 725/127 |
| 2003/0060897 A1* | 3/2003 | Matsuyama et al. | ............. | 700/1 |
| 2005/0004889 A1* | 1/2005 | Bailey et al. | ....................... | 707/1 |
| 2005/0192936 A1* | 9/2005 | Meek et al. | ..................... | 707/3 |
| 2005/0193014 A1* | 9/2005 | Prince | ........................ | 707/104.1 |
| 2006/0069663 A1* | 3/2006 | Adar et al. | ........................ | 707/1 |
| 2006/0248076 A1* | 11/2006 | Troy et al. | ........................ | 707/5 |
| 2007/0078884 A1* | 4/2007 | Ott et al. | ........................ | 707/102 |
| 2007/0214121 A1* | 9/2007 | Ebanks | ............................. | 707/3 |
| 2007/0250390 A1* | 10/2007 | Lee et al. | ......................... | 705/14 |
| 2008/0228675 A1* | 9/2008 | Duffy et al. | ...................... | 706/10 |
| 2008/0249887 A1* | 10/2008 | Cao | .................................. | 705/26 |

FOREIGN PATENT DOCUMENTS

| | | |
|---|---|---|
| EP | 00978026 | 1/2003 |
| WO | 2008000044 | 1/2008 |

* cited by examiner

*Primary Examiner* — Phong Nguyen
(74) *Attorney, Agent, or Firm* — Fish & Associates, PC

(57) ABSTRACT

Systems and methods for searching for objects located in a virtual world include having a virtual construct such as a bot crawl the virtual world by moving from place to place. Object information is collected about the objects associated with the place and the object information is stored in a searchable database. Users can search the database for objects in the virtual world. The information can be further filtered or classified to aid in searching.

20 Claims, 1 Drawing Sheet

SEARCHING FOR VIRTUAL WORLD OBJECTS

This application claims the benefit of priority to U.S. provisional application 60/979,584 filed on Oct. 12, 2007. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is search of objects or information within a virtual 3D world.

BACKGROUND

We describe a system for collecting, filtering, processing, and ranking information related to user-generated content in 3D virtual worlds such as Second Life™, for the purpose of creating a search service for 3D content.

3D objects in virtual worlds have associated meta-data that may include a title or name, a short description, the objects' location in the virtual world, information about the owners and the creators of the objects, the objects' textures (e.g., images), the objects permissions, and several flags that indicate, for example, whether the object is for sale and for how much. In addition an object can have other associated resources, including blocks of text or sounds, and contained objects from which additional meta-data can be obtained. Similarly, virtual worlds include the notion of virtual land, called places, that also has similar meta-data. Places are often defined by a finite 2D area with extremely large height.

The invention described here pertains to collecting as much information as possible from the virtual world, and then (1) filtering out information that is of no public interest, (2) processing the information so that the most useful parts get used; and (3) ranking the search results according to relevance.

Thus, there is still a need for methods of searching a virtual world for virtual objects.

SUMMARY OF THE INVENTION

The present inventive subject matter is directed toward systems and methods for searching for virtual world objects within a searchable database. A virtual construction, including a bot, crawls the virtual world by moving from one place to another. The construct identifies objects associated with the place and collects object information relating to the objects. Object information is stored in a searchable database to be retrieved later. Other aspects of the subject matter includes obtaining metadata, classifying object information in the database to aid searching, applying filters to the database to remove unwanted object information.

Various objects, features, aspects and advantages of the inventive subject matter will become more apparent from the following detailed description of preferred embodiments, along with the accompanying drawings in which like numerals represent like components.

DETAILED DESCRIPTION

Collecting Information

Figure 1:
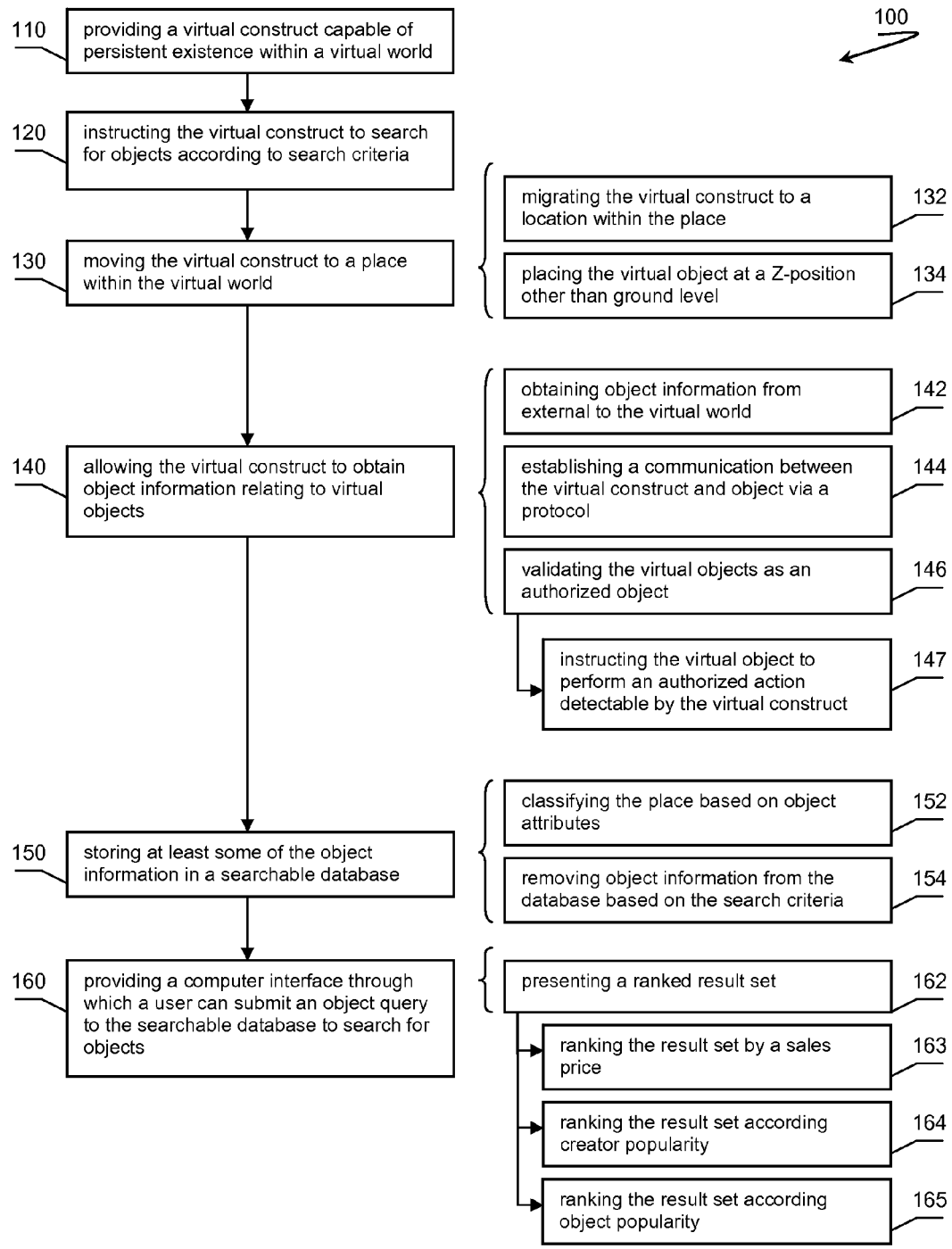
FIG. 1 is a schematic of a method for searching for virtual world objects.

Information can be collected by crawling the 3D virtual world. "Crawling" means accessing the virtual world using an automated program to collect the kinds of information that a live user can access when visiting the world. These programmed avatars are called bots. There can be multiple sources of information about the virtual world, including live access to the running virtual world system or access to static representations of parts of the system.

Virtual worlds contain many kinds of objects, and can be active or static. An active object has behavior and can respond to agents or other objects in the world.

The purpose is to preferably collect as much object information as possible where object information can include data or meta-data associated with an object. This is a challenge for two reasons: (1) virtual world servers, optimized for graphical clients, don't serve complete lists of the data; instead, they send the objects that are close to where the avatar is positioned in space; (2) the object information that an owner wish to be associated with 3D objects, especially active ones, might not be directly accessible.

Collecting Information: Positioning a Bot for Appropriate Object Collection

In some embodiments, information can be collected by position a bot at an acceptable location within a place to access virtual world objects. The term "place" is used euphemistically to reference a location within a virtual world region, space, or zone.

The bot can be placed in some arbitrary point of the place within the virtual world, for example the center. The bot can reside there for some time detecting an initial set of objects, O, along with the collection of places, P, of the virtual world. From here on, the bot can be iteratively moved from point to point in the place based on the objects in P, so that it detects more objects. Three contemplated methods, or any combination of the methods, of moving the bot include:

Method 1: Compute the center of the places in P and have the bot visit those centers. As it visits those other points, it detects more objects, adding them to O. Depending on the virtual world system, it may also detect more places, adding them to P. If the virtual space has only a few places (e.g., less than 4), then devise additional points appropriately spread out in 2D space, and have the bot visit those points. Next, collect information on objects that might be further up in vertical space by choosing arbitrary objects in O that are at specific heights (e.g., between 100 and 200 meters) and having the Bot visit the exact location of the objects.

Method 2: Apply a clustering algorithm on O (e.g, K-Means clustering) and compute the centroids of the clusters. Then have the bot visit those centroids, obtaining O'; perform the clustering algorithm on O' and compute new centroids; etc. The method can be bounded by running time, preferably less than 30 seconds, and more preferably less than 10 seconds.

Method 3: Allow the owners of the places indicate to the bot additional places that it should visit. This can be done using the general-purpose bot control protocol described below.

Collecting Information: Collecting Additional Information

Meta-data associated with in-world 3D objects might not represent complete object information about the virtual world object. In some cases, the information about the objects is stored in external databases that are accessed through in-world scripting; an example of this is vendor objects in Second Life. Additionally, other object information can include event information, blogs, or news that are published outside of the virtual world, usually on remote Internet sites, possibly sites that are unaffiliated with the virtual world (e.g., owned by a different entity). In a preferred embodiment, additional information beyond the virtual world is also stored and indexed even though the information is not explicitly embodied by 3D object in the virtual world.

In a preferred embodiment, objects within the virtual world can provide object information to the bot. The additional information can then be stored in the searchable database for later retrieval. Preferably, the object and bot communicate with each other to have a direct information exchange. In an exemplary implementation, a bot announces its presence at a place in the virtual world. In response, appropriately configured objects respond to the announcement by providing desirable object informational or additional information. One should note that other forms of protocols used by a bot and object all fall within the scope of the inventive subject matter; preferably including discovery, authentication, authorization, session management, connection management, data exchange (e.g., stream or block), security, logging, or other protocol features. The object information can include a variety of attributes including titles, descriptions, images, locations, price, document formats, URLs, owners, creators, object ID (e.g., GUID, UUID, etc. . . . ). The exemplary protocol used to obtain information from an object is referred to as the Robot Information/Control Protocol (RICP). An RICP is minimally defined as having the following capabilities: an object discovery feature and an object response feature.

As mentioned above, the protocol can also be used to guide a bot from one location to another to identify additional objects.

Information Filtering

The methods described above collect large amounts of information about 3D objects and places in a virtual world. However, not all of that information is of public interest. Filtering the data is a necessity for both privacy and relevance considerations. A preferred search engine is designed to index products (e.g., 3D objects that are for sale) or places of public interest. A bot can be programmed with search criteria used to identify relevant object. For example, the search criteria could include a requirement that all interesting objects have a "sale price" attribute. The bot would then return object information relating to those objects marked for sale while others are ignored.

In some scenarios the search criteria can be further refined to include rules. For example, content owners or creators often make mistakes on setting the properties or attributes of their objects. In a prototype test run, a bot found a large number of objects marked for sale that clearly shouldn't be. Many such objects were located in a person's private spaces. The estimated "false positive" during the prototype run is about 4% of all the objects marked for sale. False positives decrease the quality of the search service, because when searchers find them, those searchers will be sent by the search engine to private spaces or other points that are clearly of no public interest.

To reduce "false positive" rules can be included in the search criteria that operate as a function of the values of object attributes, or other object information. In the example of sales price, the search criteria could include a threshold assessment to determine if a place is classified as an interesting place to search, a commercial zone for example. The number of objects having an attribute can be compared to the number of objects lacking the attribute. If the ratio between the two is above a threshold, then the place could be of interest. Such an approach with respect to sales price can be used to distinguish between a residential zone and a commercial zone of a virtual world. In a preferred embodiment, the bot can classify a place as matching its search criteria. If a place has more than 100 objects for sale, then it is classified as commercial; if it has between 30 and 100 and the ratio between objects for sale and the total number of objects is greater than 5%, then it is also commercial; all others are classified as residential. Once this classification is established, all objects in residential region or zone are discarded. One skilled in the art will recognize that many other variations of rules can be programmed into a bot via its search criteria are possible, all of which are contemplated.

Information Processing: Images 3D objects can have several images associated with them, often called textures. For example, a box with 6 faces may have up to 6 different textures, one in each face. Objects that are on sale are often placed inside such boxes; then an image depicting the product is placed on one or more faces of the vending box as a texture. It describes to collect correct textures that are associated with a product while ignoring others.

In a preferred embodiment, images of an object are identifying using a heuristic, in which the image on each face of the object is examined. After discarding any image that are known to be common (e.g., blank images or known background images), the number of occurrences of each image is counted. The image with the lowest count is used. In cases where there are two images with the same count, one of them is selected by proximity to the center or farthest from neighboring objects. The angle of the faces with respect to the horizon can also be used, to eliminate the images on the top and bottom of a box. Although the previous example represents one possible embodiment, all alternative method for selecting an individual image fall within the scope of the inventive subject matter.

Information Processing: Landing Points

Landing points for a bot within a place are preferably chosen to identify object. Landing points are the points where people-driven avatars will land when they are interested in a specific object or place that they found through searching. There are a couple of challenges. For objects: especially those objects on sale are often placed in virtual walls; if an exact location of the object is used as the landing point, the avatars or bots could land inside those walls. For places: it often happens that the interesting content of the places is situated not on the ground but somewhere in the large vertical space above it; if the ground level is used as a Z coordinate of a landing point, people will not be able to see the place. These issues can be resolved as follow:

Place-related landing points: the landing point is defined as the median of the Z coordinates of all the objects detected in that parcel.

Object-related landing points: the landing point is the location of the object offset by a certain distance (e.g. 1 m). The direction can either be taken from the center of the object toward the face containing the selected image or toward the center space, or a combination of the two. The center space can be defined by statistically fitting object to straight lines. The detection is done by any suitable pattern matching algorithms. The center space is the center of those lines when they define an enclosure.

For places, all methods of finding a Z coordinate of a landing spot are contemplated including those Z coordinates that are not at ground level. Additionally, all methods for establishing an offset from a location associated with one or more objects are also contemplated.

Indexing and Ranking

Once the object information matching the search criteria is collected, the information is stored in a searchable database. The information can indexed by words associated with the objects or places. Furthermore, the object location information can be stored in the database. When a user searches the database, the returned results set can be ranked as a function of object attributes giving more or less weight depending on the object search query submitted by the user. The following paragraphs outline several suitable indexing or ranking schemes.

Indexing and Ranking: Term Frequency

Term Frequency—Inverted Document Frequency (TF-IDF) is used as the base ranking heuristic, giving more weight to objects and places whose associated words include several occurrences of the search terms. The TF-IDF approach can be refined in many ways, including the following additional indexing or ranking schemes.

Indexing and Ranking: Object Popularity

The ranking of objects can be weighted by their popularity. Objects may be found either in the world directly or as objects carried by an avatar and can have a popularity assigned based on whether the number of avatars carrying an object. Popularity can also be derived based on whether an object is a copy of another object. In a preferred embodiment, an object can be established as a copy if it has the same title, creator, number of primitives, or textures. To ensure a continuous, smooth variation of an object popularity metric, popularity can be averaged or be derived using Hidden Markov Model.

Indexing and Ranking: Creator Popularity

The ranking of objects can also be weighted by the popularity of a creator. The popularity of a created can be measured as the number of objects found in-world during crawling that has been created by that creator. In a preferred embodiment, the creator of an object can be referenced by the avatar associated with the creator. A smooth variation can be achieved by the same methods mentioned above.

Indexing and Ranking: Hierarchy of Word Sources

The words associated with an object or a place can come from several parts of the meta-data of the object information. Some meta-data fields can be considered more relevant than other fields. For example, a match of the search criteria on a title or name might have more weight than on the description; whereas a match on the description might have more weight than a match on extra content information.

In a preferred embodiment, the place an object is located carries more weight than in indexing or ranking than other aspect of an object.

Indexing and Ranking: Images

Objects or places with images preferably weight more than objects or places without images.

Indexing and Ranking: Implicit and Explicit Recommendations

The indexing or ranking of objects can also be based on implicit or explicit recommendations. For example, when the virtual world has a social network, where users can be associated friends or preferences, such information from social peers can be collected. The object or place preferences of social peers can be used to weight the rankings.

Grouping Search Results

Product objects are often sold at several locations in the virtual world. To avoid separate entries for the replicas in the search results, the replicas can be grouped into one single entry. Detection of replicas can be achieved by comparing the image associated with the products.

Validating Content

In virtual worlds different parts of the world might be under control of different users. Users often want to control the information that is included in search about their locations.

In some embodiments, an owner of a part of the virtual world can prohibit all gathering of information from that part of the world, can allow gathering all information, or allow only authorized information to be collected. The mechanism for achieving this is to place object(s) or script(s) in the world that communicate with the bots. The objects announce the policies of the virtual world owner to the bots. The bot can validate that the object announcing the policies is, in fact, a valid authorized object acting on behalf of the virtual land owner. The mechanism for the bot to validate the object is for the object to perform an action that only an authorized object can perform, such that the bot can detect the effect of this action and thereby know that the object is authorized to publish policies for that part of the virtual world. Preferably, the action should only be one that only the robot is aware of, so that any potential object agents are not affected. In a preferred embodiment, the object performs an action to set the "media URL" for the bot. Such an approach can be utilized within Second Life. The ability to set the media URL can be controlled by the virtual world owner. But there are other embodiments that are possible. This mechanism can also be used to authorize specific third parties to publish information in that part of the virtual world, or be used as the basis of more complex authorization schemes.

In FIG. 1 method 100 outlines an approach using the previously disclosed techniques for searching for virtual world objects.

At step 110 a virtual construct is provide that is able move about a virtual world. In a preferred embodiment, the virtual construct comprises a bot embodied by one or more software modules. In some embodiment the software modules operate as scripts running in a run-time environment supported by the computing infrastructure hosting the virtual world. For example, Linden Scripting Language (LSL) or Mono can be used to script bots within Second Life. In other embodiments, the software modules execute on external computing systems that utilize the virtual worlds interface. In a preferred embodiment, the virtual construct has a persistent existence within the virtual world where the construct is able to exist independently of a user account.

At step 120 the virtual construct is instructed to search for objects according to search criteria. The search criteria can be pre-programmed within the construct in a manner where the construct has an application specific purpose. For example, a bot can be created by a virtual world hosting service to travel around the world searching for sellable objects. The service can simply launch a new bot as necessary. In addition, the search criteria can be programmed at the launching of the construct. For example, the user could submit a "search query" to the virtual world service. The virtual world service can then program a bot to identify items matching the query. The query could include key words, images, sounds, or other digitally represented data. It is specifically contemplated that the search criteria could also include a programmed route through the virtual world. One should also note that the search criteria can be pre-define before launching the construct as well as dynamically changed while the construct is active to change the purpose or behavior of the construct.

At step 130 the virtual construct is moved to a place within the virtual world to search for objects. The construct can be moved via instructions obtained from a user interface or can be moved of its own accord based on its programming. In a preferred embodiment, the construct automatically moves from place to place searching for any objects. For example, at step 132 the construct can migrate from a location within the place to another new location based on observable objects. As previously discussed, the new location can be derived based on clusters of objects within the place, possibly using K-means cluster.

Given that the construct could operate according to different rules than other objects in the virtual world (e.g., avatars, tools, weapons, etc. . . . ), moving the construct could result in the construct being placed in abnormal positions. For example, the construct could be placed within a floor, terrain, or other areas. At step 134 it is contemplated the construct can be placed at Z-position other than ground level within the place. The Z-position can be calculated by establishing landing points based on objects within the place as previously discussed.

At step 140 the virtual construct is allowed to obtain object information relating to the virtual world objects within the place. In a preferred embodiment, the construct accesses the object information and compares the information to the construct's search criteria. If there is a substantial match, the information is collected. Object information can comprises meta-data that can include attributes, images, names, or other information defined by the object creator or provided by the virtual world system. In a preferred embodiment, the construct collects at least an attribute, an image, and a name of the object to be used within a searchable database.

In some embodiments, the object information can be obtained from external to the virtual world at step 142, possibly by accessing a remote Internet site. For example, an object could include meta-data that includes a URL reference. The construct could visit the URL to obtain the object information. Another approach includes the construct using meta-data obtained from the object (e.g., a name, creator, image, sound, etc. . . . ) as a search term to be submitted to an Internet search engine. The construct can then obtain the object information from the search results. Preferred remote Internet sites are those that are unaffiliated with an owner of the virtual world. As used herein "unaffiliated" should be interpreted to mean owned by a different owner.

At step 144 the construct can establish a communication with an object via a protocol. A preferred protocol includes the Robot Information Control Protocol previously described and includes support for authenticating the construct or the object to ensure access the object information is allowed. For example, at step 146 the construct and object can interact to validate that the object is an authorized object. The object can be authorized by the owner's of the virtual world, the creator, the owner of the place, or other entity. At step 147 the object can be validated by the construct instructing the object to perform an authenticating action whose result is detectable by the construct. An example of an authenticating action includes setting a media URL as described above.

Once the construct obtains object information from objects within the place, the information can be stored in a searchable database at step 150. The database can be owned by the same entity that owns the virtual world or could be unaffiliated with the virtual world. The object information can be indexed within the database by classifying the object information based on object attributes. Contemplated indexing schemes include indexing by term frequency, object popularity, creator popularity, hierarchy of source fields of attributes, by images, or even by sounds associated with the objects.

It is also contemplated at step 152 that the place where the construct is located can be classified based on the attributes of objects within the place. As previously discussed the construct can determine if the place is a commercial zone when there are a large number of objects in the place having "sale price" attributes relative to those objects lacking such an attribute. Classifying the place allows the construct to skip areas that lack relevant results and ensures the database is not overly populated by false positives.

At step 160 a user is able to access the searchable database via a provided computer interface. Preferred computer interfaces include web pages, web services, or APIs. The user can submit an object query through the interface to the database where the query could include a key word, image, sound or other data. The database preferably returns a result set to the user listing objects having relevant object information to the query. In a preferred embodiment, the result set is ranked, at step 162, by one or more ranking schemes. Especially preferred schemes include ranking results by a sales price (step 163), ranking results by the popularity of a creator (step 164), or ranking the results by popularity of the object (set 165). In an especially preferred embodiment, the system presents real-time updates of the result set as the virtual construct travels through the virtual world.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of searching a virtual world for objects, the method comprising providing a virtual construct capable of persistent existence within the virtual world, wherein the virtual world has at least three dimensions, and wherein the virtual construct is a web robot;

instructing the virtual construct to search for objects according to a search criteria;

moving the virtual construct to a place within the virtual world, wherein the place is at least defined by a finite two-dimensional area within the virtual world, and wherein the place is classified as a commercial zone based upon a minimum threshold number of objects for sale within the place;

allowing the virtual construct to obtain object information relating to a plurality of objects within the place that match the search criteria;

storing at least some of the object information in a searchable database; and providing a computer interface through which a user can submit an object query to the searchable database to search for objects.

2. The method of claim 1, wherein the step of allowing the virtual construct to obtain object information includes instructing the virtual construct to obtain object information external to the virtual world.

3. The method of claim 2, wherein the object information resides on an Internet accessible site that is unaffiliated with an owner of the virtual world.

4. The method of claim 1, wherein the step of moving the virtual construct to the place includes migrating the virtual construct to a centroid of a cluster of the plurality of objects.

5. The method of claim 1, wherein the step of moving the virtual construct to the place includes placing the virtual object at a Z-position other than ground level, and wherein the place is defined by a finite three-dimensional area within the virtual world.

6. The method of claim 1, wherein the search criteria includes a programmed path used to guide the virtual construct in the step of moving the virtual construct to the place.

7. The method of claim 1, wherein the step of allowing the object to obtain object information includes establishing a communication between the virtual construct and at least one of the plurality of objects via a robot information control protocol.

8. The method of claim 1, further comprising presenting a result set to the user in response to the object query where the result set is ranked.

9. The method of claim 8, further comprising ranking the result set according to an object popularity.

10. The method of claim 9, wherein the object popularity is calculated based on a Hidden Markov Model.

11. The method of claim 9, further comprising ranking the result set according to a creator popularity.

12. The method of claim 9, further comprising ranking the result set according to a recommendation based on a preference of a social peer in a social network.

13. The method of claim 9, further comprising ranking the result set by a sales price.

14. The method of claim 1, further comprising removing object information from the database based on the search criteria.

15. The method of claim 1, wherein the database is located on a computer system unaffiliated with an owner of the virtual world.

16. The method of claim 1, wherein the object information comprises an image, an attribute, and an object name.

17. The method of claim 16, further comprising classifying the place as a function of a ratio of objects having the attribute to objects lacking the attribute.

18. The method of claim 16, wherein the attribute includes a creator defined attribute defined by a creator of an object of the plurality of objects.

19. The method of claim 1, further comprising validating at least one of the plurality of objects as an authorized object.

20. The method of claim 19, further comprising instructing the at least one of the plurality of objects to perform an authorized action that is detectable by the virtual construct.

\* \* \* \* \*